Dec. 26, 1950 R. G. QUICK 2,535,091
CENTRIFUGAL VACUUM TUBE TESTER
Filed Sept. 21, 1949 3 Sheets-Sheet 1

Inventor
R. G. QUICK
M. O. Hayes
Attorney

Inventor
R. G. QUICK
By M C Hayes
Attorney

Dec. 26, 1950   R. G. QUICK   2,535,091
CENTRIFUGAL VACUUM TUBE TESTER
Filed Sept. 21, 1949   3 Sheets-Sheet 3

Inventor
R.G. QUICK

Patented Dec. 26, 1950

2,535,091

UNITED STATES PATENT OFFICE 2,535,091

CENTRIFUGAL VACUUM TUBE TESTER

Robert G. Quick, Silver Spring, Md.

Application September 21, 1949, Serial No. 116,883

14 Claims. (Cl. 315—364)

(Granted under the act of March 3, 1883, as amended April 30, 1928; 370 O. G. 757)

This invention relates generally to test apparatus and more particularly to an electronic tube testing device adapted to apply controlled acceleration shock to a tube under test from all directions laterally thereto.

Heretofore considerable difficulty has been encountered in satisfactorily testing electronic tubes particularly those for employment in naval ordnance devices such, for example, as mines, torpedos, fuze mechanisms, and the like, wherein the tubes are frequently subjected to conditions of high acceleration shock of widely varying amplitudes. It has been the common practice heretofore in testing tubes for the purpose indicated, to subject them to the conventional rapping test which consists of striking the tube from various positions while suitable instruments connected therewith record or indicate the response of the tube to the effects of the blows. This method of testing has proven highly undesirable principally because no uniformity can possibly be maintained whereby a standard of excellence of tube performance may be maintained.

Various other forms of apparatus have been employed to test the response of tubes to shock including solenoid-agitated as well as drop testing devices, most of which have the common disadvantage of limiting the direction of shock application to the particular orientation of the tube as set up in the apparatus which, as a practical measure, prevents production testing of tubes where the requirements are such as to call for all-directional lateral shock testing of each tube under specified intensities of shock.

To maintain all the advantages and obviate the disadvantages of the foregoing apparatus the applicant has provided a test instrument wherein a part under test is supported for pivotal movement about a movable axis adapted to prescribe a circular orbit about a fixed axis when driven therefrom through an extension arm operatively connecting the two axes to a variable speed source, the arm being adjustable for varying selectively the distance between the axes and thus the diameter of the orbit taken by the test part whereby the inertia effects produced and applied to the part may be controlled relative to the speed of rotation thereof about the fixed axis while means are provided for maintaining the test part in its initial position of orientation as it travels its orbit thereby presenting all sides thereof equally to the effects of the inertia forces so developed.

It is an object of the present invention to apply acceleration shock of accurately controlled amplitudes to apparatus under test from all directions laterally thereto.

It is a further object to provide a new and improved shock testing device for applying acceleration shock to vacuum tubes, or the like, of accurately controlled intensities.

It is a still further object to provide an improved shock testing device for applying to electronic vacuum tubes, or the like, lateral shock effects of uniform intensity from all directions laterally thereto.

A still further object is to provide a shock testing device whereby all-directional lateral shock effects may be applied to a vacuum tube while maintaining electrical connection therewith whereby the response of the tube to the shock applied thereto may be readily recorded.

A further object is to provide an acceleration shock testing device suitable for applying all-directional acceleration shock effects to a device under test while maintaining the device in its initial position of mounting thereon.

Other objects and many of the attendant advantages of this invention will be readily appreciated as the same becomes better understood by reference to the following detailed description when considered in connection with the accompanying drawings wherein.

Figure 1:
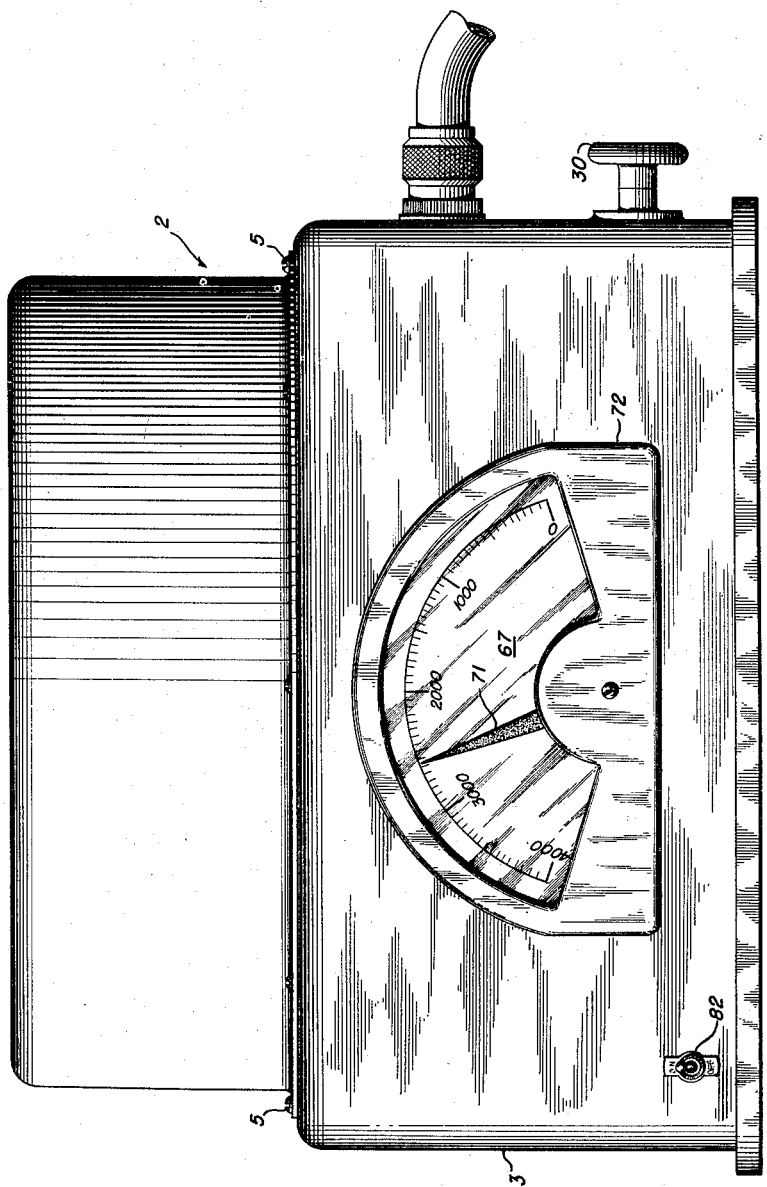
Fig. 1 is a view in elevation of the invention according to a preferred embodiment thereof.
Figure 2:
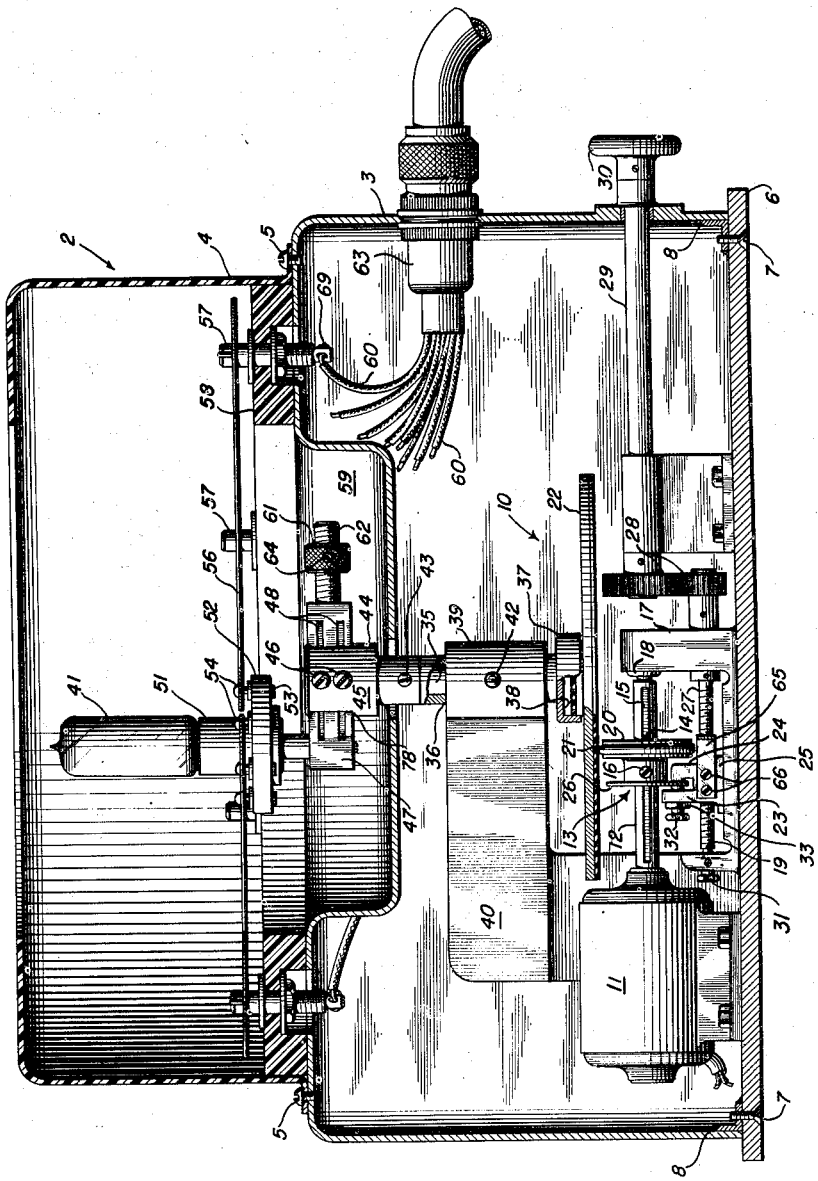
Fig. 2 is a view in section through the instrument showing the test part as mounted herein.
Figure 3:
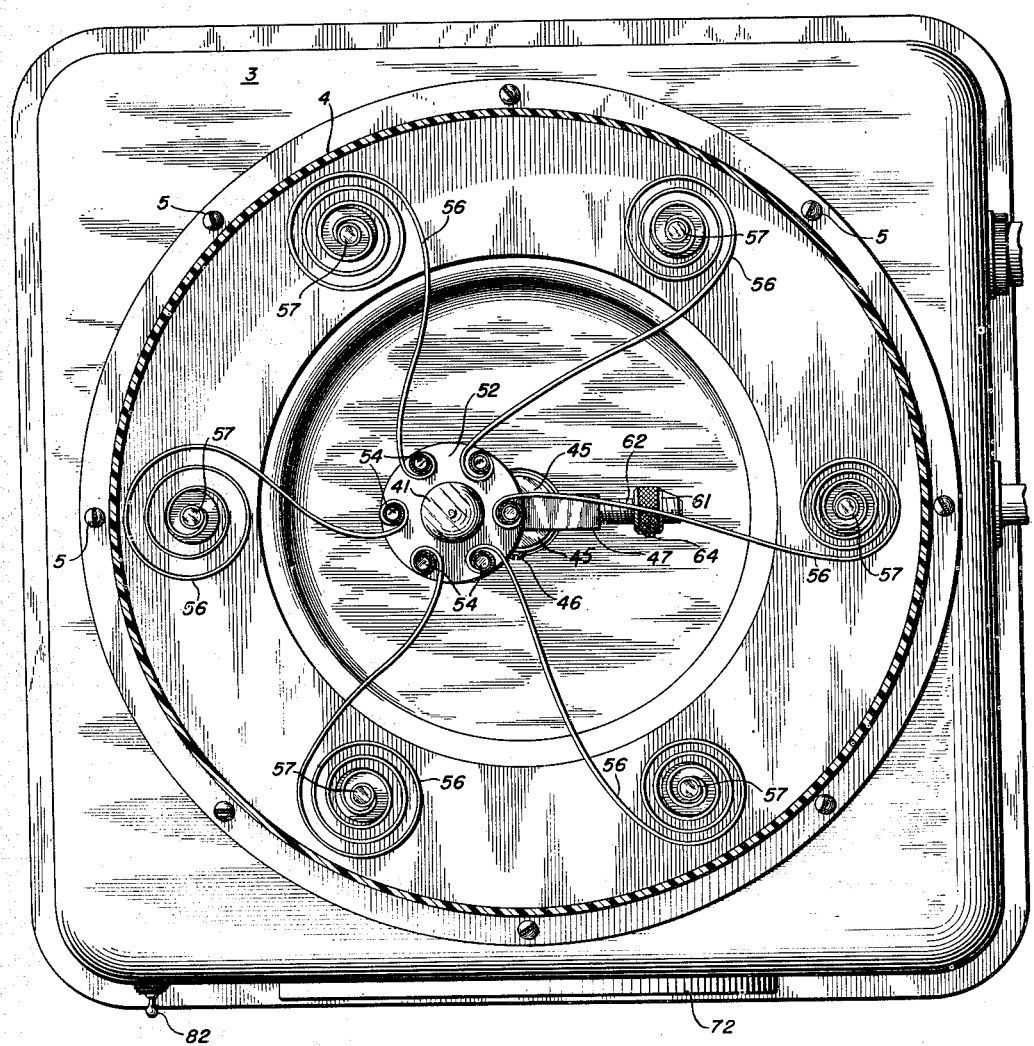
Fig. 3 is a plan view of the device of Fig. 1 partly cut away to show the arrangement of the spring conducting terminals therein and their association with the tube mounting assembly.

Referring now to the drawings and more particularly to Figs. 1 and 2 thereof, the tube testing instrument, generally designated 2, is shown as including a substantially square shaped housing 3 formed preferably from sheet metal, or the like, and adapted for supporting thereon a cylindrically formed shield 4 secured thereto as by screws 5. The housing is adapted for resting centrally upon a suitable mounting plate 6 therefor preferably cast from iron and to which the housing is secured as by a plurality of screws 7 threaded with angular tab members 8 secured to the inner face of the housing.

Mounted upon the base plate and adapted to be enclosed by the housing is a somewhat conventional speed varying mechanism generally designated 10 including a constant speed motor 11 of which the shaft 12 is elongated for supporting thereon a wheel assembly generally designated 13 and adapted for rotation with the shaft but free to move longitudinally thereon by means of a conventional key and way connection 14 and 15 respectively, the key being preferably secured within the hub of the wheel as by a set screw 16. Vertically arranged upon the supporting plate 6 is a standard 17 wherein a self-aligning bearing assembly 18 supports the end of the motor shaft 12.

The wheel assembly 13 includes an annular rim portion 20 suitably formed for retaining thereover a resilient tire or ring member 21 formed preferably from rubber, or the like, and adapted to frictionally bear against the undersurface of the annular plate member 22 whereby the plate is rotated by the wheel in a plane perpendicular to that of the wheel, the relative speed of rotation of the two varying selectively as the wheel is moved along the motor shaft beneath the plate to or from the axis of the latter.

Axial movement of the wheel in the above indicated manner is accomplished by engagement therewith of legs 23 and 24 of a bifurcated block member 25, the legs extending upwardly from the block to straddle an annular flange portion 26 of the wheel's hub whereby the wheel is carried therewith as the block is moved along a threaded shaft section 27 threaded with the block and rotatable therein by the operator by means of a driving connection including gears 28, a shaft 29, and a hand wheel 30. The threaded shaft 27 is adapted for journaling within standard 17 with the end 19 thereof supported from a set screw 31. The clearance between the legs and flange is regulated by adjustment of a set screw 32 threaded with the leg 23 and adapted to be secured in selected positions of adjustment within the leg as by a lock nut 33.

Centrally secured to the plate 22 in any suitable manner as by press fitting therein, is a shaft section 35 adapted for journaling within suitable bearings provided therefor (but not shown) as mounted within a vertically disposed bearing housing 36 having thereon an enlarged base end section 37 suitably recessed for retaining therein a thrust bearing assembly 38 adapted to receive the upward thrust of the plate 22 as it bears against the resilient surface of the wheel 13.

The housing 36 is supported vertically from within a collar 39 preferably formed integral with an annular arm section 40 that may be secured to or cast with the base plate 6 as desired, the collar having therein a set screw 42 effective when tightened to secure the housing in selective positions of adjustment therein, the screw 42 when loosened permitting the housing to be moved vertically within the collar whereby the frictional engagement of the plate with the resilient surface of the wheel 13 may be regulated.

Secured over the end of the plate shaft 35 as by a set screw 43 is a bifurcated bracket member 44 wherein is clamped between the prongs 45 thereof, as by stud screws 43, a lateral adjustable arm member 47 within which is formed milled slots 48 adapted to receive the stud portions, not shown, of the screws 46 whereby the studs are effective to prevent separation of the arm from the fork in case of loosening of the screws during high velocity rotation of the arm during test. The set screws 46, when loosened, permit the arm to be adjusted laterally within the bracket 44 whereby the orbit taken by the test part supported thereon may be selectively varied.

Figure 4:
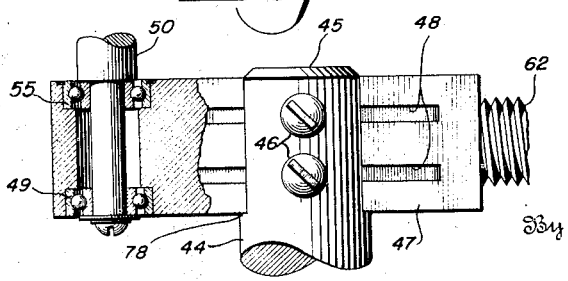
Fig. 4 is a side elevational view partly cut away of the adjustable tube supporting arm section as mounted upon the centrally arranged driving shaft therefor.

Supported from the end of the arm 47 by ball bearings 55 and 49, Fig. 4, is a freely rotatable shaft section 50 adapted for supporting thereon a tube receiving receptacle 51 wherein is shown a tube 41 mounted for testing. The tube receptacle is provided with an enlarged annular base portion 52 formed from suitable insulating material and within which terminal posts 53 of the receptacle are arranged. Extending outwardly from the posts to which they are respectively secured as by soldering thereto at 54, is a plurality of reversely coiled spring members 56, the outer ends thereof being respectively secured to stud bolts 57 arranged circumferentially about an annular insulating ring member 58 suitably secured to the upper surface of the housing in adjacency to a depressed portion 59 therein, wherein rotates the adjustable arm 47.

Leads 60 respectively connected with the bolts 57 at 69 provide means for communicating electrical data from the tube under test to a receptacle 63 conventionally arranged within the side wall of the housing and within which suitable instruments may be plugged for indicating to the operator the response of the tube to the shock effects thereto applied.

The arrangement of the springs 56 in the manner illustrated provides a yieldable connection between the freely rotatable tube receptacle 51 and the fixed instrument housing 3 whereby a tube mounted in the receptacle is maintained in its initial position of orientation as it rotates through its orbit about the shaft 35. Thus all sides of the tube are presented equally to the inertia forces created and applied thereto.

In order to reduce excessive vibration of the instrument during a test operation as caused by an unbalanced condition of the arm 47 by the presence of the test part thereon, an adjustable weight 61 is provided on a threaded portion 62 of the arm opposite the test part and adapted for movement on the arm, to or from the bracket support 44 therefor, thereby providing for effectively balancing the arm in this manner after the placing of the test part thereon, the weight 61 being thereafter secured in an adjusted position on the arm by tightening set screw 64.

The arrangement of shield 4 about the part being tested in the manner disclosed in Fig. 2, prevents injury to the operator in case the tube breaks or flies free from the socket during high velocity rotation thereof about the shaft 35.

Figure 5:
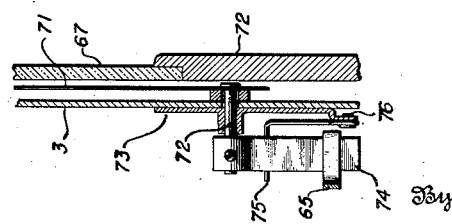
Fig. 5 is a fragmentary section through the forward panel of the housing showing the arrangement therein of the dial indicating needle and actuating means therefor.

In order that the operator may be informed as to the speed of rotation of the test part about its orbit at all times during the testing thereof, an angular arm section 65, Fig. 2, secured as by screws 66 to the face of the block member 25 and movable therewith, is adapted to urge across the face of a dial 67 a pivotally supported pointer 71, Figs. 1 and 5, thereby to indicate, as illustrated, by suitable calibrations on the dial the speed of rotation of the shaft 35 by which the test part is driven. It will be understood, however, that the dial 67 may be calibrated, if desired, according to the centrifugal forces thereon, the dial in this case having a plurality of scales for several adjusted positions of arm 47 and each of the scales preferably being marked off in G units.

The pointer 71, Figs. 1 and 5, is supported from a shaft section 72 adapted for journaling within a bracket member 73 secured as by spot welding to the inner surface of the housing 3. A fixed leg 74 depending from the inner portion of the pointer shaft provides a driving connection between the pointer and angular arm section 65 carried by the block 25. A spring finger 75, fixedly secured to bracket 73 as by a rivet 76, is adapted to bear upon the surface of the leg 74, as shown, for maintaining the leg in engagement with the arm whereby the leg is caused to follow closely the movement of the block 25. By the arrangement set forth, the block is effective to rotate the pointer 71 across the face of a calibrated dial 67 to indicate accordingly the speed of rotation of the test part about the shaft 35, the speed of the shaft, by which the part is driven, being the result of the position of the wheel 13 upon the plate 22 as selectively positioned thereon by movement of the block member 25.

In operating the device, the tube 41 to be tested is first inserted within the receptacle 51 therefor supported for free movement in the end of the arm sections 47. The set screws 46 securing the arm to the bracket 44 are then loosened and the arm adjusted laterally on the bracket to the position desired for the tube to prescribe a selected orbit about the axis of the driving shaft 35. After the arm is properly adjusted laterally, the weight 61 thereon is rotated to a position for balancing the arm upon the bracket to thereby compensate for the weight of the tube thereon. A slight clearance is preferably provided between the arm and bracket at 78 whereby the arm may rock freely upon the studs of the screws 46, when loosened, for facilitating the balancing of the arm upon the bracket. After the arm has been balanced and the set screws 46 therefore have been tightened, the hand wheel 30 is rotated directionally for moving the pointer 71 on the dial to the selected speed desired of the test, and switch 82 is then thrown to start the motor 11. The motor, when energized, is effective, by reason of the variable speed assembly 10, to immediately bring the test part to the desired speed of rotation about its orbit for producing therein the inertia effects desired. Should it be desired during test to increase or decrease the speed of rotation of the test part about its orbit and thereby to correspondingly alter the shock characteristics applied thereto, the hand wheel 30 may be rotated accordingly for moving the pointer to the speed, indicated on the dial, desired.

The arrangement set forth in the instant device wherein the tube under test is secured against rotation upon its axis as it is rotated about an orbit prescribed about a fixed axis at selected speeds of velocity, provides for exposing all sides of the tube equally to the inertia effects created during completion of each revolution of the tube about its orbit, thereby reducing greatly the time which otherwise would be required for applying a comparable test to a vacuum tube by using conventional apparatus.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. A vacuum tube tester of the character disclosed and adapted to apply controlled acceleration shock to an electronic tube under test including, in combination, a fixed support, a receptacle for receiving therein the tube to be tested, a support for said receptacle mounted for rotary movement about the axis of said tube, a rotatable driving shaft, an arm adjustable laterally from the axis of rotation of said shaft and adapted for supporting thereon said receptacle, driving means operatively connecting said shaft and including a variable speed source for applying rotation thereto thereby to cause said receptacle to prescribe a circular orbit about said shaft at a velocity controlled by said source, and yieldable means operatively connecting said receptacle to said fixed support for preventing rotation of the tube about its axis as it is moved about the axis of the shaft.

2. A device, as set forth in claim 1, further characterized in that the yieldable means connecting the receptacle to a fixed support is adapted to communicate electrical signals from said tube to electronic test apparatus connected therewith.

3. A vacuum tube testing device of the character disclosed and adapted to apply controlled acceleration shock to the tube under test including, in combination, a housing, a variable speed drive disposed within said housing and including a constant speed motor, an elongated shaft section provided on and forming a part of said motor, a friction wheel movable longitudinally on said shaft and fixed for rotation therewith, an annular plate engageable by said wheel and adapted for rotation thereby in a plane normal to the plane of rotation of the wheel, means movable by the operator to selectively shift the position of the wheel with respect to the plate whereby the speed of rotation of the plate may be varied; a second shaft rotatable by said plate and having thereon an arm section adjustable laterally therefrom, a mount for said tube rotatable on said arm, and yieldable means operatively connecting said mount with said housing for preventing rotation of the tube and mount about the axis of the mount as the tube is caused to prescribe a predetermined circular orbit about said second shaft at the end of the arm section driven thereby.

4. In a device of the character disclosed for testing electronic vacuum tubes for acceleration shock comprising, in combination, a receptacle adapted for retaining therein the tube to be tested, a mount for said receptacle and having a shaft portion depending vertically therefrom in axial alignment with the tube mounted in said receptacle, bearings arranged about said shaft for permitting free rotational movement thereof, a second shaft member, an arm releasably secured to said second shaft and adjustable laterally therefrom, said arm having a recess provided therein adjacent one end thereof for retaining said bearings for supporting for rotation on said arm the first named shaft, the axis of the first named shaft being perpendicular to the axis of said second shaft, means including a variable speed source for applying rotation to said second shaft for causing the tube to prescribe an orbit thereabout at a predetermined velocity sufficient to introduce into the tube the inertia effects desired, a fixed support, and means including a plurality of springs operatively connecting said tube receptacle with said fixed support for yieldably maintaining the tube against rotation about its axis as the tube is caused to prescribe said orbit from the end of said arm whereby all parts of the tube are presented equally to said inertia effects during each rotation of the tube about the axis of the said second shaft.

5. In a tube testing device of the character disclosed, a receptacle for receiving therein the tube to be tested, a fixed support, a support for said receptacle mounted for free rotation about the axis of said tube, a driving shaft rotatively mounted on said fixed support, an arm carried by said shaft and adjustable laterally therefrom for supporting said receptacle thereon, driving means operatively connected to said shaft for applying rotation thereto thereby to cause said receptacle to prescribe an orbit about said shaft, and yieldable means operatively connecting said receptacle to said fixed support for preventing rotation of the receptacle about said tube axis while permitting rotation thereof about the axis of said shaft.

6. A shock testing device of the character disclosed and adapted for applying controlled acceleration shock to electronic vacuum tubes or the like, comprising, in combination, a receptacle for retaining therein a tube to be tested, a support for said receptacle having thereon a centrally depending shaft portion arranged in axial alignment with said tube, a bracket member, an arm section horizontally disposed on said bracket and adapted for lateral adjustment thereon, means for securing said arm in an adjusted position on said bracket, a plurality of bearings for supporting said shaft vertically from one end of said arm for allowing free rotary movement thereon of said tube, a second shaft arranged vertically from said bracket and adapted for rotation of the bracket and arm about the axis thereof, thereby causing the tube to move in a circular orbit about the last named axis, a variable speed drive operatively connected to said second shaft and controllable by the operator to apply selectively variable speeds of rotation to the second shaft, a fixed support, and yieldable means for connecting said tube receptacle to said fixed support for preventing rotation of the tube about its axis as it rotates its orbit about the axis of the said second shaft.

7. A device of the character disclosed adapted to apply controlled acceleration shock to electrical apparatus under test including, in combination, a housing, a variable speed drive arranged within said housing and comprising a constant speed motor, a shaft rotatable by said motor, a wheel slideably arranged on said shaft but fixed for rotation therewith, an annular plate mounted for rotation in a plane normal to that of said wheel and adapted for being driven thereby from a frictional surface provided on said wheel, means movable at will for varying selectively the ratio of rotation of said plate with respect to that of the wheel by movement of the wheel selectively to or from the axis of rotation of said plate, a pointer, said last named means including an arm movable therewith for actuating said pointer for indicating the speed of rotation of said plate, a second shaft rotatable with said plate, a second arm, a bracket mounted for rotation with said second shaft and adapted for supporting thereon said arm for lateral adjustment of the arm on the bracket, means forming a part of said bracket for releasably securing said arm thereto in selective positions of adjustment thereon, means including a plurality of bearings arranged in said arm, a third shaft vertically disposed with respect to said arm and adapted for journaling in said bearings, a mount provided on said third shaft for supporting thereon the object to be tested whereby as said second arm is rotated the object is caused to prescribe a circular orbit about said second shaft at a velocity controlled by said variable speed drive, and yieldable means operatively connecting said mount with said housing for preventing said mount from deviating from its initial position of orientation as it is caused to rotate its orbit about the said second shaft.

8. A device as set forth in claim 7 further characterized in that said yieldable means comprises a plurality of electrically insulated conductors connected electrically to the object under test whereby electrical impulses may be communicated therethrough from the object under test to test apparatus connected therewith 9. In a shock testing device of the character disclosed adapted to apply controlled acceleration shock to electrical apparatus under test including, in combination, a fixed support, a shaft mounted for rotation and operatively associated with said support, a variable driving source for said shaft for applying selective speeds of rotation thereto, an arm adjustable laterally from said shaft and adapted for rotation thereby, a bracket adapted for supporting thereon an object to be tested and pivotally supported from one end of said arm thereby to prescribe a circular orbit about the axis of said shaft as said arm is rotated, and means yieldably connecting said bracket to said fixed support for maintaining the bracket in its initial position of orientation as it is rotated about its orbit.

10. A device as set forth in claim 9 further characterized in that said yieldable means comprises a plurality of electrically insulated conductors connected electrically to said object under test whereby electrical impulses may be communicated therethrough from the object under test to test apparatus connected therewith.

11. In a shock testing device of the character disclosed adapted to apply controlled acceleration shock to apparatus under test including, in combination, a fixed support, a shaft mounted for rotation and operatively associated with said support, a variable driving source for said shaft for applying selective speeds of rotation thereto, an arm supported by and adjustable laterally from said shaft for rotation therewith, a bracket adapted for supporting thereon an object to be tested and pivotally supported from one end of said arm thereby to prescribe a circular orbit about the axis of the shaft as said arm is rotated, a weight adjustably mounted on the other end of said arm for balancing the weight of the test part thereon, and means yieldably connecting said bracket to said fixed support for causing the bracket to maintain its initial position of orientation as it is rotated about its orbit.

12. A device as set forth in claim 11 further characterized in that said yieldable means comprises a plurality of inversely spiralled electroconducting and insulated springs electrically connected to the object under test whereby electrical impulses may be communicated therethrough from the object under test to test apparatus connected therewith.

13. A device of the character disclosed adapted to apply controlled acceleration shock to apparatus under test including, in combination, a housing, a horizontally disposed shaft arranged in said housing and adapted for rotational movement therein, a constant speed source adapted to apply rotation to said shaft, a wheel mounted for longitudinal movement on said shaft and fixed for rotation therewith, an annular plate disposed in a plane normal to that of said wheel and adapted for rotation thereby from frictional engagement of said wheel therewith, a second shaft centrally fixed to said plate and rotatable thereby with its axis perpendicular to the axis of said first named shaft, a bracket supported from the free end of said second shaft in axial alignment therewith, an extensible arm member adjustable laterally across said bracket and releasably secured thereto whereby the arm is adapted to rotate about the axis of said second shaft as the said second shaft is rotated, a receptacle supported for pivotal movement upon the free end of said arm and adapted for retaining therein an object to be tested whereby the receptacle and object are caused to prescribe a circular orbit about the axis of said second shaft at a velocity controlled by the rate of rotation of said plate, and means including a plurality of inversely spiralled electro-conducting springs for yieldably connecting said receptacle with said housing whereby said receptacle is caused to rotate relative to its pivot thereby to maintain its initial position of orientation as it is caused to rotate about its orbit from the end of said arm, said receptacle having means for electrically connecting the object under test to said springs, said springs being respectively insulated whereby electrical impulses may be communicated therethrough from the part under test mounted in said receptacle to suitable test apparatus connected therewith.

14. A device of the character disclosed adapted to apply controlled acceleration shock to electronic tubes or the like and including, in combination, a housing; a variable speed drive arranged within said housing and comprising a constant speed electrically driven motor, an elongated shaft extending outwardly from and forming a part of the armature of said motor, a keyway provided in said shaft, a wheel slidably arranged on said shaft and having a key therein for being received in said keyway whereby the said wheel is fixed for rotation with said shaft, an annular plate mounted for rotation in a plane normal to that of said wheel and adapted for being driven from the surface of the wheel by frictional engagement therewith, means controllable by the operator to vary selectively the position of frictional engagement of said wheel with said plate thereby to vary accordingly the speed of rotation of the latter, a scale, a pointer operatively associated with said scale, means operatively connecting said pointer with said wheel whereby said wheel is effective to drive said pointer across said scale upon slideable movement of the wheel on the shaft thereby to indicate the speed of rotation of said plate; a second shaft rotatable with said plate; a bifurcated bracket member mounted upon and rotatable by said second shaft; an arm supported in said bracket and adjusted laterally from said second shaft; means forming a part of said bracket for releasably securing said arm in selective positions of lateral adjustment therein; a third shaft; means for pivotally supporting the last named shaft vertically from one end of said arm; a mount supported from the free end of said third shaft for supporting thereon the object to be tested whereby as the arm is rotated the said object is caused to prescribe a circular orbit about the axis of said second shaft at a velocity controlled by said variable speed source; and yieldable means operatively connecting said mount with said housing for preventing said mount from deviating from its initial position of orientation as it is caused to rotate said circular orbit.

ROBERT G. QUICK.

No references cited.